(12) United States Patent
Park et al.

(10) Patent No.: US 10,669,375 B2
(45) Date of Patent: Jun. 2, 2020

(54) COPOLYCARBONATE AND COMPOSITION COMPRISING THE SAME

(71) Applicant: LG CHEM, LTD., Seoul (KR)

(72) Inventors: Jung Jun Park, Daejeon (KR); Young Young Hwang, Daejeon (KR); Moo Ho Hong, Daejeon (KR); Hyong Min Bahn, Daejeon (KR); Ki Jae Lee, Daejeon (KR)

(73) Assignee: LG CHEM LTD., Seoul (KR)

( * ) Notice: Subject to any disclaimer, the term of this patent is extended or adjusted under 35 U.S.C. 154(b) by 41 days.

(21) Appl. No.: 16/081,017

(22) PCT Filed: Oct. 16, 2017

(86) PCT No.: PCT/KR2017/011409
§ 371 (c)(1),
(2) Date: Aug. 29, 2018

(87) PCT Pub. No.: WO2018/074796
PCT Pub. Date: Apr. 26, 2018

(65) Prior Publication Data
US 2019/0016855 A1    Jan. 17, 2019

(30) Foreign Application Priority Data

Oct. 20, 2016  (KR) ........................ 10-2016-0136729

(51) Int. Cl.
| C08L 69/00 | (2006.01) |
| C08G 77/448 | (2006.01) |
| C08G 64/18 | (2006.01) |
| C08G 64/08 | (2006.01) |
| C08L 83/10 | (2006.01) |
| C08L 83/04 | (2006.01) |
| C08G 77/24 | (2006.01) |

(52) U.S. Cl.
CPC ......... *C08G 64/085* (2013.01); *C08G 64/186* (2013.01); *C08G 77/448* (2013.01); *C08L 69/00* (2013.01); *C08L 83/04* (2013.01); *C08L 83/10* (2013.01); *C08G 77/24* (2013.01)

(58) Field of Classification Search
None
See application file for complete search history.

(56) References Cited

U.S. PATENT DOCUMENTS

| 2003/0105226 A1 | 6/2003 | Cella et al. |
| 2005/0137310 A1 | 6/2005 | Gupta et al. |
| 2008/0103268 A1 | 5/2008 | December et al. |
| 2013/0317150 A1 | 11/2013 | Wan et al. |
| 2014/0058023 A1 | 2/2014 | Wan et al. |
| 2015/0064374 A1 | 3/2015 | Jain et al. |
| 2016/0319127 A1 | 11/2016 | Jeong et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |
| 2016/0369095 A1 | 12/2016 | Park et al. |
| 2016/0376405 A1 | 12/2016 | Park et al. |
| 2017/0137568 A1 | 5/2017 | Chun et al. |
| 2017/0158852 A1 | 6/2017 | Ko et al. |
| 2017/0190833 A1 | 7/2017 | Hwang et al. |
| 2017/0275456 A1 | 9/2017 | Hwang et al. |
| 2017/0292019 A1 | 10/2017 | Lee et al. |
| 2017/0298221 A1 | 10/2017 | Son et al. |
| 2017/0298222 A1 | 10/2017 | Lee et al. |
| 2017/0306146 A1 | 10/2017 | Lee et al. |
| 2017/0321014 A1 | 11/2017 | Lee et al. |

FOREIGN PATENT DOCUMENTS

| JP | 05-127411 A | 5/1993 |
| JP | 07325407 A | 12/1995 |
| JP | 08234468 A | 9/1996 |
| JP | 11199663 A | 7/1999 |
| JP | 2005519177 A | 6/2005 |
| JP | 2007514854 A | 6/2007 |
| JP | 4166363 B | 10/2008 |
| KR | 1020130125358 A | 11/2013 |
| KR | 101458053 B | 11/2014 |
| KR | 1020150046239 A | 4/2015 |
| KR | 1020160047566 A | 5/2016 |
| KR | 1020160067734 A | 6/2016 |
| WO | 2016/089026 A1 | 6/2016 |
| WO | 2016/089118 A2 | 6/2016 |
| WO | 2016/089171 A1 | 6/2016 |
| WO | WO 2016/089024 * | 6/2016 |

OTHER PUBLICATIONS

Anashkin, D. O. et al.,"Fluorine-containing poly(carbonate-block-siloxane) copolymers", Polymer Science Series B, 2012, vol. 54 (1-2) p. 94-98.

* cited by examiner

*Primary Examiner* — David J Buttner
(74) *Attorney, Agent, or Firm* — Dentons US LLP

(57) ABSTRACT

The present disclosure relates to a copolycarbonate having improved impact strength at low temperature and yellow index simultaneously, a composition including the same, and the copolycarbonate comprising:
an aromatic polycarbonate-based first repeating unit,
an aromatic polycarbonate-based second repeating unit having at least one siloxane bond, and
an aromatic polycarbonate-based third repeating unit having at least one siloxane bond containing fluoro-substituted $C_{1-15}$ alkyl.

11 Claims, 2 Drawing Sheets

[Fig.1]
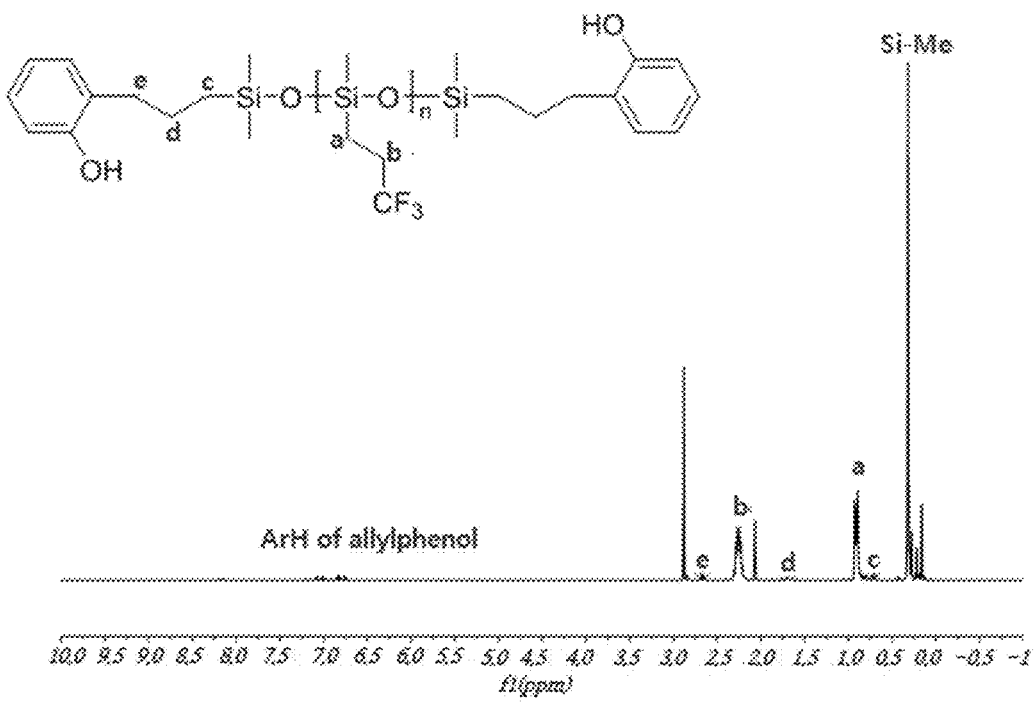

[Fig. 2]
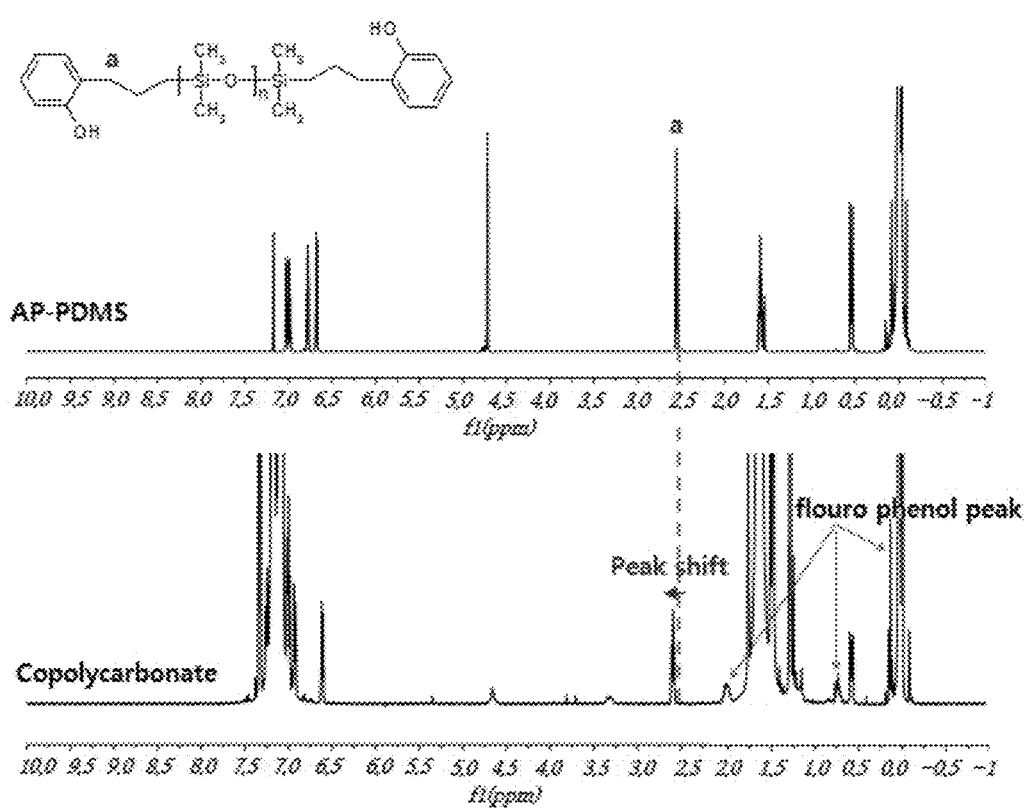

COPOLYCARBONATE AND COMPOSITION COMPRISING THE SAME

This application is a National Stage Application of International Application No. PCT/KR2017/011409, filed Oct. 16, 2017, and claims the benefit of Korean Patent Application No. 10-2016-0136729 filed on Oct. 20, 2016, contents of which are incorporated herein by reference in their entirety for all purposes as if fully set forth below.

CROSS-REFERENCE TO RELATED APPLICATION

This application claims the benefit of Korean Patent Application No. 10-2016-0136729 filed on Oct. 20, 2016 with the Korean Intellectual Property Office, the disclosure of which is incorporated herein by reference in its entirety.

BACKGROUND OF THE INVENTION

(a) Field of the Invention

The present disclosure relates to a copolycarbonate having improved impact strength at low temperature and YI (Yellow Index) simultaneously, and a composition including the same.

(b) Description of the Related Art

Polycarbonate resins are prepared by condensation-polymerization of an aromatic diol such as bisphenol A with a carbonate precursor such as phosgene, and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and other properties such as YI (Yellow Index) are deteriorated when impact strength, particularly impact strength at low temperature is increased.

Therefore, the present inventors have studied copolycarbonate resins having improved impact strength at low temperature and YI (Yellow Index) simultaneously by solving the above disadvantages, and have found that a copolycarbonate in which a specific polysiloxane structure is introduced into the main chain of the polycarbonate as described below satisfies the above conditions, thereby completing the present invention.

SUMMARY OF THE INVENTION

It is an object of the present disclosure to provide a copolycarbonate having improved impact strength at low temperature and YI (Yellow Index) simultaneously.

It is another object of the present disclosure to provide a composition including the copolycarbonate.

In order to achieve the above objects, the present disclosure provides a copolycarbonate comprising an aromatic polycarbonate-based first repeating unit, an aromatic polycarbonate-based second repeating unit having at least one siloxane bond, and an aromatic polycarbonate-based third repeating unit having at least one siloxane bond containing fluoro-substituted $C_{1-15}$ alkyl, wherein the copolycarbonate has YI (Yellow Index) of 1 to 3.9 in accordance with ASTM D1925, and impact strength at low temperature of 700 to 1000 J/m, measured at −30° C. in accordance with ASTM D256 (⅛ inch, Notched Izod).

Preferably, the YI (Yellow Index) is 1 or more, 1.5 or more, 2 or more, 2.2 or more, 2.3 or more, or 2.5 or more, and 3.9 or less, 3.8 or less, or 3.7 or less.

Preferably, the impact strength at low temperature (J/m) is 700 or more, 710 or more, 720 or more, 730 or more, 740 or more, or 750 or more. In addition, there is no specific upper limit, because the higher impact strength at low temperature can be evaluated as the better. However, for example, the upper limit may be 970 or less, 960 or less, or 950 or less.

Preferably, the copolycarbonate according to the present disclosure has impact strength at room temperature of 800 to 1100 J/m, measured at 23° C. in accordance with ASTM D256 (⅛ inch, Notched Izod). More preferably, the impact strength at room temperature (J/m) is 810 or more, 820 or more, 830 or more, 840 or more, or 850 or more. In addition, there is no specific upper limit, because the higher impact strength at room temperature can be evaluated as the better. However, for example, the upper limit may be 1050 or less, 1040 or less, 1030 or less, 1020 or less, 1010 or less, 1000 or less, or 990 or less.

In addition, the copolycarbonate has a weight average molecular weight (g/mol) of 1,000 to 100,000, preferably 10,000 to 50,000, more preferably 20,000 to 40,000, and further more preferably 25,000 to 35,000.

The polycarbonate resin is prepared by condensation-polymerization of an aromatic diol such as bisphenol A with a carbonate precursor such as phosgene, and it itself has excellent mechanical properties, but it is necessary to satisfy various physical properties at the same time depending on the application field. Particularly, the polycarbonate resin may improve specific physical properties by changing the structure of the polycarbonate resin. However, in most cases, when one of the physical properties is improved, the other properties are deteriorated.

Accordingly, the present disclosure introduced a repeating unit having at least one siloxane bond and a repeating unit having at least one siloxane bond containing fluoro-substituted $C_{1-15}$ alkyl in addition to the conventional polycarbonate structure to improve impact strength at low temperature and YI (Yellow Index). By introducing the second and third repeating units, various physical properties of the polycarbonate can be improved without deteriorating other physical properties.

Hereinafter, a copolycarbonate and a composition including the same according to specific embodiments of the present disclosure will be described in more detail.

The First Repeating Unit

The aromatic polycarbonate-based first repeating unit forms a basic structure of the copolycarbonate resin according to the present disclosure, and is formed by reacting an aromatic diol compound and a carbonate precursor. The first repeating unit may be represented by the following Chemical Formula 1:

[Chemical Formula 1]

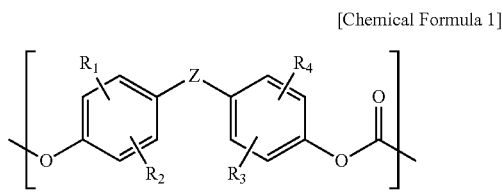

in Chemical Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In Chemical Formula 1, preferably, $R_1$ to $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

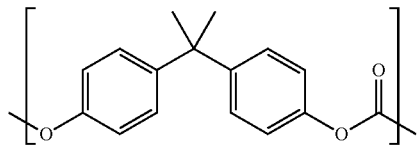

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

The Second Repeating Unit

The aromatic polycarbonate-based second repeating unit having at least one siloxane bond may be introduced into copolycarbonate to improve various physical properties. The second repeating unit may be represented by the following Chemical Formula 2:

[Chemical Formula 2]

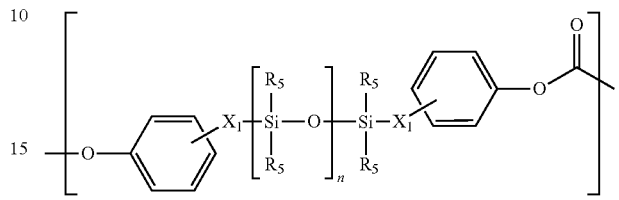

in Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200.

In Chemical Formula 2, each of $X_1$ is independently preferably $C_{2-10}$ alkylene, more preferably $C_{2-4}$ alkylene, and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl, and most preferably methyl.

Preferably, n is an integer of 10 or more, 15 or more, 20 or more, 25 or more, 30 or more, 31 or more, or 32 or more, and 50 or less, 45 or less, 40 or less, 39 or less, 38 or less, or 37 or less.

The repeating unit represented by Chemical Formula 2 is derived from a siloxane compound represented by the following Chemical Formula 2-1:

[Chemical Formula 2-1]

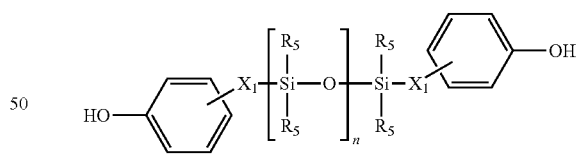

in Chemical Formula 2-1, $X_1$, $R_5$ and n are the same as previously defined.

As used herein, 'derived from a siloxane compound' means that a hydroxy group of the respective siloxane compound and a carbonate precursor are reacted to form the repeating unit represented by Chemical Formula 2. Further, the carbonate precursors that can be used for the formation of the repeating unit represented by Chemical Formula 2 is the same as those described for the carbonate precursor that can be used for the formation of the repeating unit represented by Chemical Formula 1 described above.

Preferably, the repeating unit represented by Chemical Formula 2 is represented by the following Chemical Formula 2-2:

[Chemical Formula 2-2]

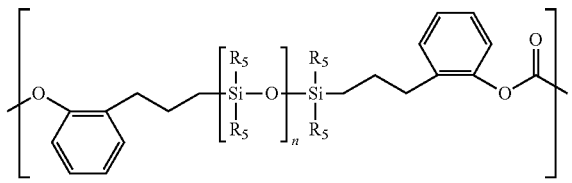

in Chemical Formula 2-2, $R_5$ and n are the same as previously defined. Preferably, $R_5$ is methyl.

The Third Repeating Unit

The aromatic polycarbonate-based third repeating unit having at least one siloxane bond containing fluoro-substituted $C_{1-15}$ alkyl may be introduced into copolycarbonate to improve YI. The third repeating unit may be represented by the following Chemical Formula 3:

[Chemical Formula 3]

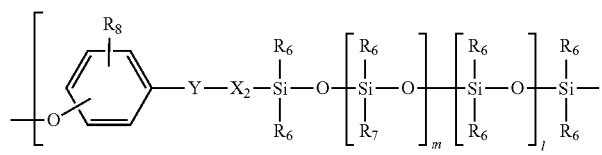

in Chemical Formula 3, each of $X_2$ is independently $C_{1-10}$ alkylene, each of Y is independently a single bond or COO, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, $R_7$ is $C_{1-15}$ alkyl substituted with one to three fluoro, each of $R_8$ is independently hydrogen, $C_{1-10}$ alkyl, $C_{1-10}$ alkoxy, $C_{6-20}$ aryl, hydroxy, or halogen, and m and l are each independently an integer of 1 to 200.

In Chemical Formula 3, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl, and most preferably methyl.

In addition, $R_7$ is preferably $—(CH_2)_pCH_qF_r$, wherein p is an integer of 0 to 10, q and r are each independently an integer of 0 to 3, and q+r is 3.

Preferably, the sum of m and l is an integer of 30 or more, 35 or more, 40 or more, 45 or more, 46 or more, 47 or more, or 48 or more, and 70 or less, 65 or less, 60 or less, 55 or less, 54 or less, or 53 or less.

The repeating unit represented by Chemical Formula 3 is derived from a siloxane compound represented by the following Chemical Formula 3-1:

[Chemical Formula 3-1]

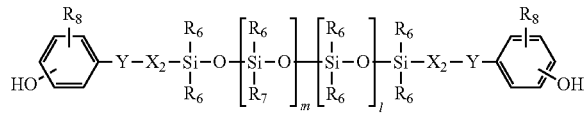

in Chemical Formula 3-1, $X_2$, Y, $R_6$ to $R_8$, m and l are the same as previously defined.

Preferably, the repeating unit represented by Chemical Formula 3 is represented by the following Chemical Formula 3-2:

[Chemical Formula 3-2]

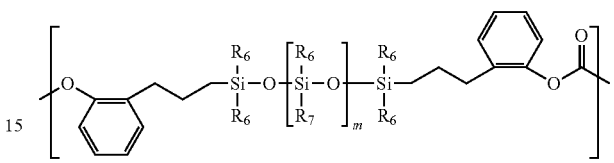

in Chemical Formula 3-2, $R_6$ to $R_7$, and m are the same as previously defined. Preferably, $R_6$ is methyl, and $R_7$ is $—(CH_2)_2CF_3$.

Copolycarbonate

The copolycarbonate according to the present disclosure includes the first repeating unit, the second repeating unit, and the third repeating unit, and preferably includes the repeating unit represented by Chemical Formula 1, the repeating unit represented by Chemical Formula 2, and the repeating unit represented by Chemical Formula 3. Preferably, the copolycarbonate is a random copolymer.

In addition, the various properties of the copolycarbonate may be improved simultaneously by controlling the content of each repeating unit. The weight ratio between the aromatic polycarbonate-based second repeating unit having at least one siloxane bond and the aromatic polycarbonate-based third repeating unit having at least one siloxane bond containing fluoro-substituted $C_{1-15}$ alkyl may be 99:1 to 1:99. Preferably, the weight ratio is 99:1 to 70:30, and more preferably 99:1 to 80:20. The weight ratio of the above repeating units corresponds to the weight ratio of siloxane compounds, for example the siloxane compound represented by Chemical Formula 2-1 and the siloxane compound represented by Chemical Formula 3-1.

The copolycarbonate according to the present disclosure may be prepared by the method including the step of polymerizing the aromatic diol compound, the carbonate precursor, and two kinds of siloxane compounds.

The aromatic diol compound, the carbonate precursor, and the siloxane compounds are the same as previously described.

In addition, the polymerization may be carried out by an interfacial polymerization method. In this case, there is an advantage in that the polymerization reaction can be made at atmospheric pressure and low temperature, and it is easy to control the molecular weight. The interfacial polymerization is preferably carried out in the presence of an acid binding agent and an organic solvent. Further, the interfacial polymerization may include, for example, pre-polymerization followed by introduction of a coupling agent, and then polymerization again. In this case, a high molecular weight copolycarbonate may be obtained.

The materials used in the interfacial polymerization are not particularly limited as long as it can be used in the polymerization of polycarbonate, and the amount thereof can be adjusted as needed.

For example, the acid binding agent may be alkali metal hydroxides such as sodium hydroxide or potassium hydroxide, or amine compounds such as pyridine.

The organic solvent is not particularly limited as long as it is a solvent that can be usually used in the polymerization of polycarbonate. For example, halogenated hydrocarbon such as methylene chloride or chlorobenzene may be used.

In addition, a reaction accelerator, for example, a tertiary amine compound such as triethylamine, tetra-n-butyl ammonium bromide, and tetra-n-butylphosphonium bromide, a quaternary ammonium compound, or a quaternary phosphonium compound may be further used for accelerating the interfacial polymerization reaction.

The reaction temperature is preferably from 0° C. to 40° C., and the reaction time is preferably from 10 minutes to 5 hours. In addition, pH is preferably maintained at 9 or more, or 11 or more during the interfacial polymerization reaction.

In addition, the interfacial polymerization may be conducted further including a molecular weight modifier. The molecular weight modifier may be added before the initiation of polymerization, during the initiation of polymerization, or after the initiation of polymerization.

As the above molecular weight modifier, mono-alkylphenol may be used. For example, the molecular weight modifier may be one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol may be used. Preferably, it is p-tert-butylphenol, and in this case, the effect of controlling the molecular weight is big.

The molecular weight modifier is contained, for example, in an amount of 0.01 parts by weight or more, 0.1 parts by weight or more, or 1 parts by weight or more, and 10 parts by weight or less, 6 parts by weight or less, or 5 parts by weight or less, based on 100 parts by weight of the aromatic diol compound. Within this range, the required molecular weight can be obtained.

Polycarbonate Composition

In addition, the present disclosure provides a polycarbonate composition including the above-mentioned copolycarbonate and a polycarbonate.

The copolycarbonate may be used alone, but it can be used together with the polycarbonate as needed to control the physical properties of the copolycarbonate.

The above polycarbonate is distinguished from the copolycarbonate according to the present disclosure in that a polysiloxane structure is not introduced in a main chain of the polycarbonate.

Preferably, the above polycarbonate includes a repeating unit represented by the following Chemical Formula 4:

[Chemical Formula 4]

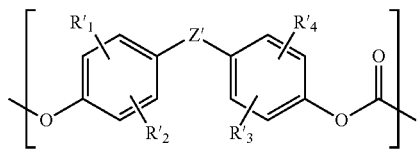

in Chemical Formula 4, $R'_1$ to $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In addition, the above polycarbonate has a weight average molecular weight of preferably 1,000 to 100,000 g/mol, more preferably 10,000 to 35,000 g/mol.

The repeating unit represented by Chemical Formula 4 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$ to $R'_4$ and $Z'$ in Chemical Formula 4 are the same as previously described for $R_1$ to $R_4$ and $Z$ in Chemical Formula 1, respectively.

Further, preferably, the repeating unit represented by Chemical Formula 4 is represented by the following Chemical Formula 4-1:

[Chemical Formula 4-1]

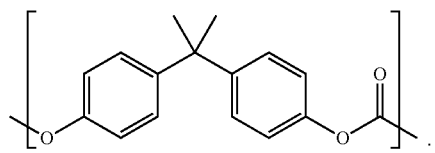

In addition, the polycarbonate composition may further include one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

In addition, the present disclosure provides an article including the above-mentioned polycarbonate composition. Preferably, the article is an injection molded article.

The method for preparing the article may include the steps of mixing the polycarbonate composition according to the present disclosure and the additives, if necessary, using a mixer, extrusion-molding the mixture with an extruder to produce a pellet, drying the pellet and then injecting the dried pellet using an injection molding machine.

As described above, the copolycarbonate according to the present disclosure may introduce a specific polysiloxane structure into the main chain of the polycarbonate, thereby improving the chemical resistance while maintaining the excellent physical properties of the polycarbonate.

BRIEF DESCRIPTION OF THE DRAWINGS

FIG. 1 is a $^1$H NMR graph of the compound prepared in Preparation Example 2.

FIG. 2 is a $^1$H NMR graph (top) of the compound prepared in Preparation Example 1, and a $^1$H NMR graph (bottom) of the copolycarbonate prepared in Example 1 using the same.

DETAILED DESCRIPTION OF THE EMBODIMENTS

The present invention will be described in more detail with reference to the following Examples. However, the following examples are for illustrative purposes only, and the invention is not intended to be limited by the following examples.

Preparation Example 1: AP-PDMS(n=34)

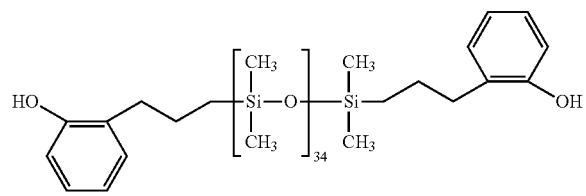

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as AP-PDMS (n=34). AP-PDMS was pale yellow oil and the repeating unit (n) was 34 when confirmed through $^1$H NMR using Varian 500 MHz, and further purification was not required.

Preparation Example 2: Si—F-PDMS(m+1=50)

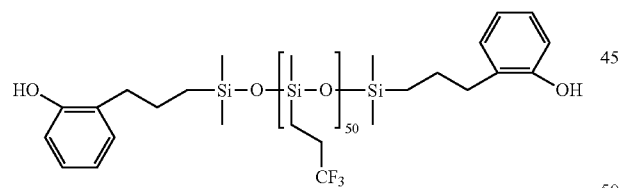

35.70 g of the sum of octamethylcyclotetrasiloxane and poly (methyl-trifluoropropyl) dimethylsiloxane and 2.40 g (17.8 mmol) of tetramethyldisiloxane were mixed, and the mixture was introduced in 3 L flask together with 1 part by weight of an acid clay (DC-A3) relative to 100 parts by weight of octamethylcyclotetrasiloxane and poly (methyl-trifluoropropyl) dimethylsiloxane, and reacted at 60° C. for 4 hours. After completion of the reaction, the reaction product was diluted with ethyl acetate and quickly filtered using a celite. The repeating unit (the sum of m and l) of the terminal-unmodified polyorganosiloxane thus prepared was 50 when confirmed through $^1$H NMR.

To the resulting terminal-unmodified polyorganosiloxane, 0.01 g (50 ppm) of Karstedt's platinum catalyst was added and reacted at 90° C. for 1 hour. And then, 4.81 g (35.9 mmol) of 2-allylphenol was further added thereto and reacted for 3 hours. After completion of the reaction, the unreacted siloxane was removed by conducting evaporation under the conditions of 120° C. and 1 torr. In this manner, a liquid type of pale yellow transparent terminal-modified polyorganosiloxane was obtained.

Thereafter, 1,000 mL (based on liquid phase) of chloroform (CHCl$_3$) was added to a refluxable 2,000 mL three-necked flask, and 7.1 g of terephthaloyl chloride was dissolved slowly at room temperature (20 to 26° C.) for 1 hour while maintaining nitrogen atmosphere. Then, 25 g of triethylamine was added thereto and reacted for 1 hour. 175 g of the terminal-modified polyorganosiloxane was added thereto, and sufficiently reacted to prepare the compound represented by the above formula, and it was confirmed by $^1$H NMR.

Example 1

1784 g of water, 385 g of NaOH and 232 g of BPA (bisphenol A) were added to the polymerization reactor, and mixed and dissolved in N$_2$ atmosphere. 4.3 g of PTBP (para-tert butylphenol), 16.7 g of AP-PDMS (n=34) prepared in Preparation Example 1 and 0.17 g of Si—F-PDMS (m+1=50) (a weight ratio of 99:1) were dissolved in MC (methylene chloride), and added thereto. Thereafter, 128 g of TPG (triphosgene) was dissolved in MC, and this was added thereto to carry out the reaction for 1 hour while maintaining the pH at 11 or higher. After 10 minutes, 46 g of TEA (triethylamine) was added thereto to perform coupling reaction. After a total reaction time of 1 hour and 20 minutes, the pH was lowered to 4 to remove TEA and washed three times with distilled water to adjust the pH of the resulting polymer to 6-7, neutral. The polymer obtained above was reprecipitated in a mixed solution of methanol and hexane, and then dried at 120° C. to obtain a final copolycarbonate.

Example 2

A copolycarbonate was prepared in the same manner as in Example 1, except that the AP-PDMS was used in an amount of 16 g, and the Si—F-PDMS was used in an amount of 0.85 g (a weight ratio of 95:5).

Example 3

A copolycarbonate was prepared in the same manner as in Example 1, except that the AP-PDMS was used in an amount of 15.2 g, and the Si—F-PDMS was used in an amount of 1.69 g (a weight ratio of 90:10).

Example 4

A copolycarbonate was prepared in the same manner as in Example 1, except that the AP-PDMS was used in an amount of 14.3 g, and the Si—F-PDMS was used in an amount of 2.54 g (a weight ratio of 85:15).

Example 5

A copolycarbonate was prepared in the same manner as in Example 1, except that the AP-PDMS was used in an amount of 15.2 g, and the Si—F-PDMS was used in an amount of 1.69 g (a weight ratio of 90:10). And then, the above copolycarbonate and a general PC having a molecular weight of about 29,000 (Comparative Example 1) were mixed at a weight ratio of 8:2.

Comparative Example 1

1784 g of water, 385 g of NaOH and 232 g of BPA (bisphenol A) were added to the polymerization reactor, and mixed and dissolved in $N_2$ atmosphere. 4.86 g of PTBP (para-tert butylphenol) was dissolved in MC (methylene chloride), and added thereto. Thereafter, 128 g of TPG (triphosgene) was dissolved in MC, and this was added thereto to carry out the reaction for 1 hour while maintaining the pH at 11 or higher. After 10 minutes, 46 g of TEA (triethylamine) was added thereto to perform coupling reaction. After a total reaction time of 1 hour and 20 minutes, the pH was lowered to 4 to remove TEA and washed three times with distilled water to adjust the pH of the resulting polymer to 6-7, neutral. The polymer obtained above was reprecipitated in a mixed solution of methanol and hexane, and then dried at 120° C. to obtain a final copolycarbonate.

Comparative Example 2

1784 g of water, 385 g of NaOH and 232 g of BPA (bisphenol A) were added to the polymerization reactor, and mixed and dissolved in $N_2$ atmosphere. 4.3 g of PTBP (para-tert butylphenol), and 16.9 g of AP-PDMS(n=34) prepared in Preparation Example 1 were dissolved in MC (methylene chloride), and added thereto. Thereafter, 128 g of TPG (triphosgene) was dissolved in MC, and this was added thereto to carry out the reaction for 1 hour while maintaining the pH at 11 or higher. After 10 minutes, 46 g of TEA (triethylamine) was added thereto to perform coupling reaction. After a total reaction time of 1 hour and 20 minutes, the pH was lowered to 4 to remove TEA and washed three times with distilled water to adjust the pH of the resulting polymer to 6-7, neutral. The polymer obtained above was reprecipitated in a mixed solution of methanol and hexane, and then dried at 120° C. to obtain a final copolycarbonate.

Experimental Example

Each property was measured by the following method. The results are given in the following Table 1.

1) weight average molecular weight (Mw): measured by GPC with PS standard using Agilent 1200 series.
2) impact strength at room temperature and low temperature: measured in accordance with ASTM D256 (⅛ inch, Notched Izod) at room temperature and −30° C. (low temperature).
3) flowability (Melt Index; MI): measured in accordance with ASTM D1238 (300° C., 1.2 kg condition).
4) YI (Yellow Index): measured in accordance with ASTM D1925.

Referring to Table 1, it was confirmed that the copolycarbonates prepared in Examples 1 to 5 in which two kinds of specific polysiloxane structures were introduced into the main chain of the polycarbonate exhibited the same level of impact strength at room temperature and low temperature, compared with the general polycarbonate of Comparative Example 1 and the copolycarbonate of Comparative Example 2 in which one kind of polysiloxane structure was introduced into the main chain of the polycarbonate.

Further, it was confirmed that the copolycarbonates prepared in Examples 1 to 5 exhibited improved YI (Yellow Index) compared with the copolycarbonate of Comparative Example 2 in which one kind of polysiloxane structure was introduced into the main chain of the polycarbonate.

The invention claimed is:

1. A copolycarbonate, comprising:
    an aromatic polycarbonate-based first repeating unit,
    an aromatic polycarbonate-based second repeating unit having at least one siloxane bond, and
    an aromatic polycarbonate-based third repeating unit having at least one siloxane bond containing fluoro-substituted $C_{1-15}$ alkyl,
    wherein the first repeating unit is represented by the following Chemical Formula 1:

[Chemical Formula 1]

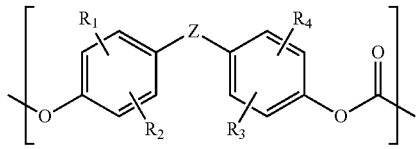

in Chemical Formula 1,
$R_1$ to $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,
wherein the second repeating unit is represented by the following Chemical Formula 2:

TABLE 1

| | Example 1 | Example 2 | Example 3 | Example 4 | Example 5 | Comparative Example 1 | Comparative Example 2 |
|---|---|---|---|---|---|---|---|
| Mw (g/mol) | 30,000 | 30,000 | 30,000 | 30,000 | 28,000 | 30,000 | 30,000 |
| impact strength at room temperature (J/mol) | 900 | 950 | 980 | 990 | 850 | 870 | 750 |
| impact strength at low temperature (J/mol) | 850 | 910 | 940 | 950 | 750 | 200 | 600 |
| YI | 3.2 | 3.3 | 3.5 | 3.7 | 2.5 | 1.2 | 4 |

[Chemical Formula 2]

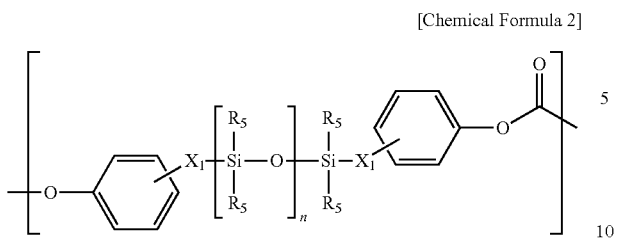

in Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; or $C_{6-20}$ aryl, and n is an integer of 10 to 200, wherein the third repeating unit is represented by the following Chemical Formula 3:

[Chemical Formula 3]

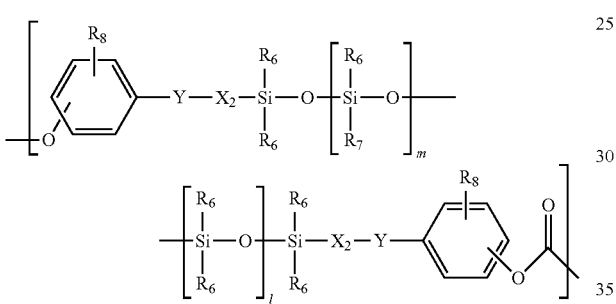

in Chemical Formula 3, each of $X_2$ is independently $C_{1-10}$ alkylene, each of Y is independently a single bond, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, $R_7$ is $C_{1-15}$ alkyl substituted with one to three fluoro, each of $R_8$ is independently hydrogen, $C_{1-10}$ alkyl, $C_{1-10}$ alkoxy, $C_{6-20}$ aryl, hydroxy, or halogen, and m and l are each independently an integer of 1 to 200, wherein the copolycarbonate has YI (Yellow Index) of 1 to 3.9 in accordance with ASTM D1925, and the copolycarbonate has impact strength at low temperature of 700 to 1000 J/m, measured at −30° C. in accordance with ASTM D256 (⅛ inch, Notched Izod).

2. The copolycarbonate according to claim 1,
wherein the copolycarbonate has impact strength at room temperature of 800 to 1100 J/m, measured at 23° C. in accordance with ASTM D256 (⅛ inch, Notched Izod).

3. The copolycarbonate according to claim 1,
wherein a weight average molecular weight is 1,000 to 100,000 g/mol.

4. The copolycarbonate according to claim 1,
wherein a weight ratio of the second repeating unit and the third repeating unit is 1:99 to 99:1.

5. The copolycarbonate according to claim 1,
wherein the repeating unit represented by Chemical Formula 2 is represented by the following Chemical Formula 2-2:

[Chemical Formula 2-2]

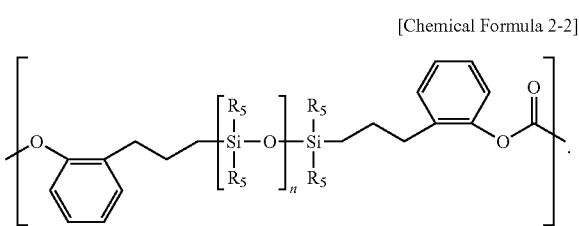

6. The copolycarbonate according to claim 1,
wherein n is an integer of 10 to 50.

7. The copolycarbonate according to claim 1,
wherein $R_7$ is $-(CH_2)_p CH_q F_r$,
in the chemical formula, p is an integer of 0 to 10,
q is an integer from 0 to 2 and r is an integer from 1 to 3, and q+r is 3.

8. The copolycarbonate according to claim 1,
wherein the repeating unit represented by Chemical Formula 3 is represented by the following Chemical Formula 3-2:

[Chemical Formula 3-2]

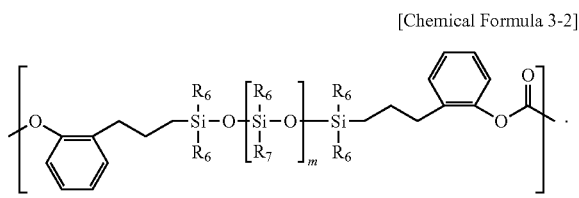

9. The copolycarbonate according to claim 1,
wherein the sum of m and l is an integer of 30 to 70.

10. A polycarbonate composition comprising the copolycarbonate according to claim 1, and a polycarbonate.

11. The polycarbonate composition according to claim 10,
wherein a polysiloxane structure is not introduced in a main chain of the polycarbonate.

* * * * *